United States Patent [19]

Coulon et al.

[11] Patent Number: 4,837,093
[45] Date of Patent: Jun. 6, 1989

[54] UNIFORMLY COATED GLASS SUBSTRATES

[75] Inventors: Jean-Claude Coulon, Mercurey; Jean-Pierre Douche, Thourotte, both of France

[73] Assignee: Saint-Gobain Vitrage, Courbevoie, France

[21] Appl. No.: 45,739

[22] Filed: May 5, 1987

Related U.S. Application Data

[63] Continuation of Ser. No. 794,364, Nov. 4, 1985, abandoned, which is a continuation of Ser. No. 588,329, Mar. 12, 1984, Pat. No. 4,562,095.

[30] Foreign Application Priority Data

Mar. 14, 1983 [FR] France ................................ 83 04124

[51] Int. Cl.⁴ .................... B32B 17/06; B32B 15/00
[52] U.S. Cl. .................................... 428/432; 428/426
[58] Field of Search .................... 427/168; 118/308; 65/60.5, 60.51, 60.52; 239/597; 428/426, 432

[56] References Cited

U.S. PATENT DOCUMENTS

| | | | |
|---|---|---|---|
| 3,536,580 | 10/1970 | La Fave | 118/308 X |
| 3,677,814 | 7/1972 | Gillery | 117/211 |
| 4,019,887 | 8/1977 | Kirkbride et al. | 65/60 C |
| 4,146,657 | 5/1979 | Gordon | 427/126 |
| 4,172,159 | 10/1979 | Marcault | 427/160 |
| 4,230,271 | 10/1980 | Marcault | 239/597 |
| 4,325,988 | 4/1982 | Wagner | 427/168 X |
| 4,344,986 | 8/1982 | Henery | 427/168 X |
| 4,349,372 | 9/1982 | Von Laethem et al. | 65/60.4 |
| 4,397,671 | 8/1983 | Vong | 65/60.52 |
| 4,401,695 | 8/1983 | Sopko | 427/168 |
| 4,562,095 | 12/1985 | Coulon | 239/597 X |

Primary Examiner—Shrive Beck
Attorney, Agent, or Firm—Pennie & Edmonds

[57] ABSTRACT

A method and apparatus are described for coating a substrate such as glass with a powder such as a compound that can be decomposed by heat. The method comprises the steps of forming a sheet of powder suspended in a gas moving toward the substrate to be coated, homogenizing the mixture of powder and gas by creating turbulences in it, and accelerating the sheet in the direction of the substrate with flowing gas having greater velocity than that of the sheet. This method and the apparatus which implements it are particularly useful in the manufacture of glass coated with a film such as metal oxide.

35 Claims, 3 Drawing Sheets

UNIFORMLY COATED GLASS SUBSTRATES

CROSS-REFERENCE TO RELATED APPLICATION

This is a continuation of application Ser. No. 794,364 filed Nov. 4, 1985, abandoned, which is a continuation of application Ser. No. 588,329 filed Mar. 12, 1984, now U.S. Pat. No. 4,562,095.

A related U.S. Patent is "Method and Apparatus for Uniformly Coating a Substrate with a Powder," U.S. Pat. No. 4,533,571, which is incorporated herein by reference.

BACKGROUND OF THE INVENTION

This relates to the uniform coating of a substrate with a powder and more particularly to the uniform distribution of a powder through a slit to coat a substrate with a film having particular properties. For example, in the case of a glass substrate, the film might provide particular optical and electrical properties for the glass.

U.S. Pat. No. 4,230,271 and its corresponding French patent FR 2 427 141, which are incorporated herein by reference, describe an elongated nozzle for continuously distributing gas-entrained powders across a substrate. A stream of powder suspended in a gas is introduced into the nozzle through a multiplicity of conduits arranged in a row extending the length of the nozzle. The powder stream is then diluted with additional gas in an approximately rectangular homogenization chamber likewise extending the entire length of the nozzle. The gas-entrained powder is then directed through a passage that is oval in cross-section with walls that initially diverge, are then parallel and finally converge at a distribution slit above the substrate. Additional gas may be introduced into the powder stream by a gas supply located in the middle of the oval.

While this nozzle gives advantageous results, it is still quite susceptible to clogging and periodically requires cleaning to continue operating correctly. The downtime for cleaning results in lost production. Moreover, while such nozzles have been made with distribution slit lengths of 250 to 650 mm., the glass ribbons they are used to coat may be several meters wide, requiring the use of several identical nozzles placed end to end to coat the full width of the ribbon. In such circumstances, it is extremely difficult to balance the various nozzles so as to assure a regular distribution of powder coating over the entire width of the glass. It would be preferable to use a single nozzle with a distribution slit as long as the several meters of width of the glass ribbon; but it has been found that when the length of the nozzle is increased appreciably, the regularity of powder distribution is reduced. In particular, the track of the powder feed conduits can be discerned on the glass and clogging is faster.

SUMMARY OF THE INVENTION

The present invention aims at remedying these drawbacks while making it possible to coat several meters of width of a substrate such as the entire width of a glass ribbon made on a float installation.

In accordance with the invention, a gas-entrained powder is introduced by a multiplicity of separate feed conduits into a nozzle. There the powder stream is formed into a sheet, the mixture of gas and powder is diluted by additional gases and the entrained powder is accelerated in the direction of the substrate by making the walls of the enclosure converge uniformly.

A nozzle that implements the first embodiment of the invention comprises a homogenization zone which receives powder from a multiplicity of conduits as well as homogenization gas which creates turbulences in the powder to homogenize the distribution of the powder. The nozzle further comprises an acceleration zone that receives homogenized powder stream from the homogenization zone and accelerates it with streams of gas that are introduced at high velocity on the sides of the powder stream. In the acceleration zone, the powder stream is directed through a relatively narrow slit whose side walls converge toward a distribution slit from which the powder stream is directed at a substrate.

A nozzle that implements the second embodiment comprises a single zone in which the powder stream is simultaneously mixed and accelerated by high velocity jets of gas that are introduced on the sides of the powder stream near the point where the powder stream enters the nozzle. In this embodiment, the input to the nozzle is open to the atmosphere and the accelerating gases induce the entry of atmospheric gases that promote homogenization. Advantageously, the speed of the accelerating gases is much higher than that of the powder stream and may even be sonic.

With the present invention, it is possible to obtain coatings of very regular thicknesses, with varitions in thickness being on the order of only 15 to 20 Angstroms, regardless of the powder delivery and/or thickness of the coating. Such small variations in thickness result in light transmissions variations on the order of only 1%. The resulting coatings can also be very thin, e.g., less than 0.1 micron and even on the order of 400 to 800 Angstroms.

Within this technique, it is possible to make on an industrial scale, i.e., with a large output volumes, glasses coated with a blue second-order interference layer whose dominant wavelength in reflection is 480 nanometers (nm) and in transmission 575 nm when lighted by standard illuminant C.

A fortiori, interference layers of other colors can also be obtained since they allow greater variations in thickness without perception of alteration of color.

BRIEF DESCRIPTION OF THE DRAWING

These and other objects, features and advantages of the invention will be more readily apparent from the following detailed description of preferred embodiment of the invention in which.

DESCRIPTION OF PREFERRED EMBODIMENT OF INVENTION

Figure 1:
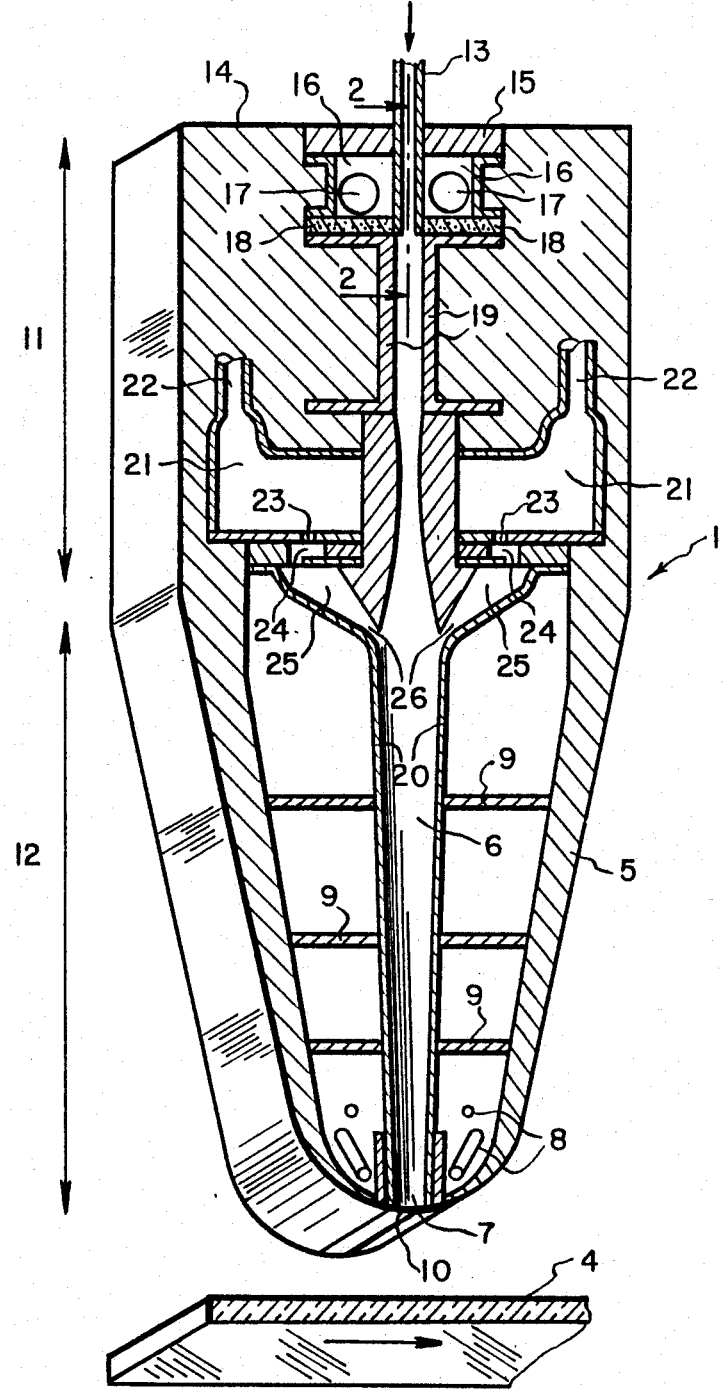
FIG. 1 is a cross-sectional view of a first preferred embodiment of the present invention.
Figure 2:
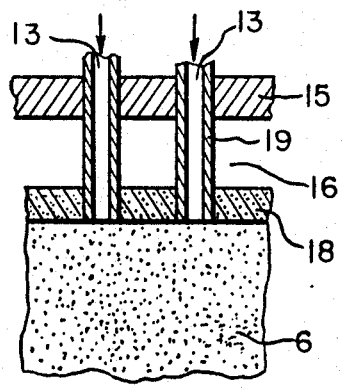
FIG. 2 is a longitudinal cross-sectional view along lines 2—2 of a portion of the embodiment of FIG. 1.
Figure 3:
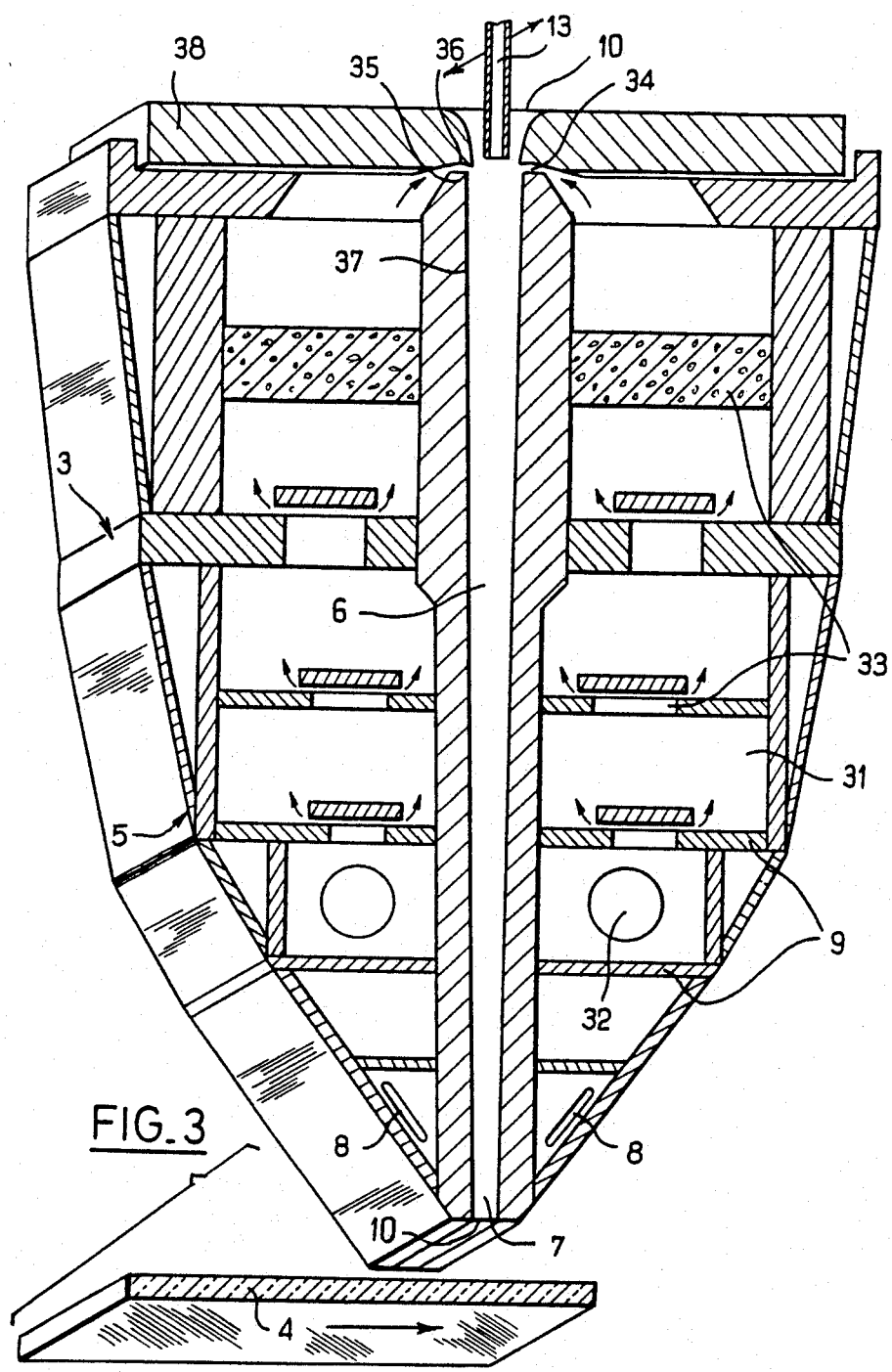
FIG. 3 is a cross-sectional view of a second preferred embodiment of the present invention.

FIGS. 1 and 3 show, in cross section, powder distribution nozzles 1 and 3 of the present invention. The nozzle is used to coat a powder on a substrate 4, one of the substrate and nozzle being moved relative to the other. Illustratively, substrate 4 is a glass ribbon passing at uniform speed under nozzle 1 or 3 which is kept stationary. The direction of movement of substrate 4 is indicated by the arrow in FIGS. 1 and 3. Advantageously, the nozzle extends longitudinally across the entire substrate in the direction perpendicular to its direction of movement, a distance that may range from about fifty centimeters to several meters. Throughout this longitudinal extent, the cross-section of the nozzle is substantially the same except for a detail described in conjunction with FIG. 2 and a pair of side plates that close off the nozzle at either end.

Nozzles 1 and 3 comprise a body 5 in which there is a narrow enclosure 6 through which the powder travels and a distribution slit 7 from which the powder is discharged. The width of enclosure 6 is on the order of only 1/50 to 1/100 of its height and its variations are relatively slight and in any case are continuous and regular.

Nozzles 1 and 3 also contain in their lower portion cooling elements 8 such as water conduits to prevent overheating of the nozzle tip because of the proximity of the substrate 4 which is generally at a high temperature for coating with the powder. Advantageously, various reinforcements or braces 9 are used to maintain the shape of the nozzle.

Nozzle 1 comprises two zones superimposed in height, an upper zone 11 called the homogenization zone and a lower zone 12 called the acceleration zone, through which enclosure 6 extends. Enclosure 6 is fed powder at its upper end, generally in suspension in a primary gas such as air, by a multiplicity of feed conduits 13 that are regularly distributed in a row in the lengthwise direction of the nozzle in an upper wall 14 of nozzle body 5. For example, the conduits may be uniformly spaced about 5 cm. from one another.

Conduits 13 illustratively are supplied from the division of one or more equivalent elementary conduits, coming from a supply of powder suspended in a gas. Alternatively, a worm screw located at the base of a hopper filled with powder may be used to extract a measured amount of powder that can then be diluted, suspended in gas and set in motion by the addition of gas, generally air, under pressure. Fluid tightness around conduits 13 is provided by a seal 15.

Conduits 13 extend through a plenum 16 and empty into opening 6. Plenum 16 is fed gas or air under pressure by conduits 17 that extend the length of the nozzle on either side of the row of conduits 13 and have holes along their walls. The bottom of plenum 16 is a pair of porous "Poral" type plates 18, likewise extending the length of the nozzle, through which gas or air is introduced into opening 6 approximately uniformly over its entire length.

FIG. 2 shows in longitudinal section, i.e., along a median plane laid along the length of the nozzle, the relation of conduits 13, opening 6 and plenum 16.

The gas that diffuses through "Poral" type plates 18 creates turbulences in the powder which mix the gas and air so as to make the distribution of the powder over the entire nozzle length in zone 11 homogeneous and uniform. Moreover, the turbulences minimize any clogging of the face of "Ploral" plates 18.

After release from conduits 13 and homogenization in the gas from plenum 16, the powder forms a stream of powder suspended in gas and shaped like a sheet, i.e., a thin continuous stream, having the length of the nozzle and extending toward the bottom of the nozzle between the approximately vertical walls 19 of opening 6 in zone 11. With increasingly greater distance from the feed conduits, homogenization of the mixture of gas and powder and the uniformity of its distribution on the inside of enclosure 6 increases as the powder advances. Advantageously, the two walls 19 of enclosure 6 which face one another in zone 11 converge slightly toward one another. Consequently, there are a slight acceleration of the powder and a rolling of the sheet-like powder stream which improve the homogeneity and uniformity of the distribution even more.

A slight divergence of the two walls 19 immediately follows the convergence mentioned above, causing the powder stream to slow. This succession of divergence and convergence, causing first acceleration and then deceleration of the powder stream, further improves homogenization and uniform distribution of the powder.

At the end of homogenization zone 11, the mixture of powder and gas distributed from the separate jets of conduits 13 has become uniformly distributed over the entire cross-section of the powder stream.

The powder stream then enters acceleration zone 12. It is important to give the powder stream a forward velocity from the output of the nozzle that is at least on the order of 10 to 15 m/s for several reasons: to obtain a sufficient coating of substrate 4 in a short time, which is particularly necessary in the case of rapid movement of the substrate, to obtain a good adherence of the powder on the substrate, and to keep the powder from flying away between the moment it is released by distribution slit 7 at the output end of the nozzle and the moment when it comes in contact with the substrate. On the other hand, to the extent that the reaction of the powder on the substrate 4 requires a high temperature, it is also important not to cool the substrate too much and therefore it is necessary to limit the amount of gas used to carry the powder. For example, when powders of organometallic compounds of the DBTO (dibutyltin oxide) or DBTF (dibutyltin difluoride) type with a grain size between 5 and 40 um are projected onto glass substrates for decomposition of these compounds under the effect of heat, the impact velocities of the powder on the glass should be at least 10 m/s and advantageously should be between 25 and 45 m/s.

Acceleration of the powder suspended in the sheet-like stream is achieved in acceleration zone 12 of nozzle 1 by convergence of wall portions 20 and by injection of additional gas, such as air, at high veocity along the sides of the sheet-like stream, throughout the entire length of the nozzle.

Advantageously, to avoid turbulences in the stream that can create clogging and destroy the homogeneity and uniformity of the distribution of the powder mixture in the carrier gas, the convergence of the walls is regular to provide a constant acceleration. Thus, the two wall portions 20 are plane walls forming an angle on the order of 5° with the median plane and at their end delimiting a distribution slit 7 of about 4 mm. in width. This width is about 3 to 4 times narrower than the width of enclosure 6 at the input of the acceleration zone.

Additional gas in injected into the acceleration zone through two identical chambers 21 that extend the length of the nozzle on either side of enclosure 6. Gas is supplied to chambers 21 under pressure from conduits 22. The gas from chambers 22 enters enclosure 6 through orifices 23 each of which comprises a slit extending the entire length of the nozzle that opens into baffled recess 24 that empties into a chamber 25 placed next to opening 6 at the beginning of acceleration zone 12. Each chamber 25 communicates with opening 6 by a narrow slit 26, located at the end of the divergent portion of opening 6 at the end of homogenization zone 11, thus introducing on each side of the sheet-like powder stream additional gas at high velocity which accelerates the powder stream. To provide such acceleration, this additional gas has a velocity greater than that of the powder stream. The acceleration imparted by this additional gas is further increased by the regular convergence of walls 20.

The pressure drops caused by narrow orifices 23 and baffled recesses 24 on these additional gas feeds make it possible to inject into opening 6 gas streams at uniform pressure over the entire length of the nozzle.

FIG. 3 depicts a second embodiment of the invention in which the homogenization zone and acceleration zone are merged and in which the input of powder feed conduits 13 is not fluid-tight. In many respects, however, nozzle 3 is similar to nozzle 1 and similar elements bear the same numbers.

In this second embodiment, nozzle 3 may be fed by any means able to introduce powder into opening 6 over its entire length. If such means are feed conduits 13, spaced over the entire length of the nozzle and delivering a multiplicity of jets, the conduits advantageously end at the input of opening 6 without going through fluid-tight means. Conduits 13 can be stationary or moving; for example, they may be driven in reciprocating movement in the lengthwise direction of the nozzle, a distance on the order of the average spacing between the two conduits 13.

Opening 6 of nozzle 3 is regularly convergent from the input of the nozzle to distribution slit 7 and the width of opening 6 at the slit 7 is about 3 to 4 times less than its width at the nozzle input. For example, the width of opening 6 at its input may be about 15 mm., and at the distribution slit about 4 mm., and the plane walls which define opening 6 may form an angle on the order of 5° with the median plane.

The two halves of the nozzle body 5 located on each side of opening 6 are hollow and each forms a series of spaces 31 for pressurized gas, each space being separated from the neighboring space of the same series by a partition forming a brace such as 9. A series of passages 33 made of expansion slits or of a "Poral" type porous material interconnect spaces 31 to exhaust slits 34 that extend the length of the nozzle on either side of the input to opening 6. The spaces 31 and passages 33 equalize the gas pressure over the entire length of the nozzle so that the exhaust flow through slits 34 is constant over the entire length.

Each slit 34 has lips 35 and 36 that are shaped to direct the jet of gas from spaces 31 approximately tangentially to a wall of opening 6 to form a lamellar flow. More precisely, the angle between the jet and the wall should be less than about 7° so that the jet remains attached to the wall.

The lower lip 35 of each blowing slit 34 is formed by a rounded upper edge of side wall 37 of opening 6; and the upper lip is formed by a rounded lower edge of the end part of a plate 38 that covers the uppermost space 31. This edge has a shape complementary to the shape of lip 35 and extends slightly downward to direct the jet of pressurized gas tangentially to the wall. Gas flow through slit 34 may be adjusted by sliding plate 38 in a direction perpendicular to the walls of opening 6.

Gas is injected through slits 34 at a velocity much greater than the velocity of the powder at the output of conduits 13 or any other equivalent feed means. Advantageously, this velocity is sonic to increase the acceleration of the mixture and promote uniform distribution of the injected gas over the entire length of the nozzle.

Figure 4:
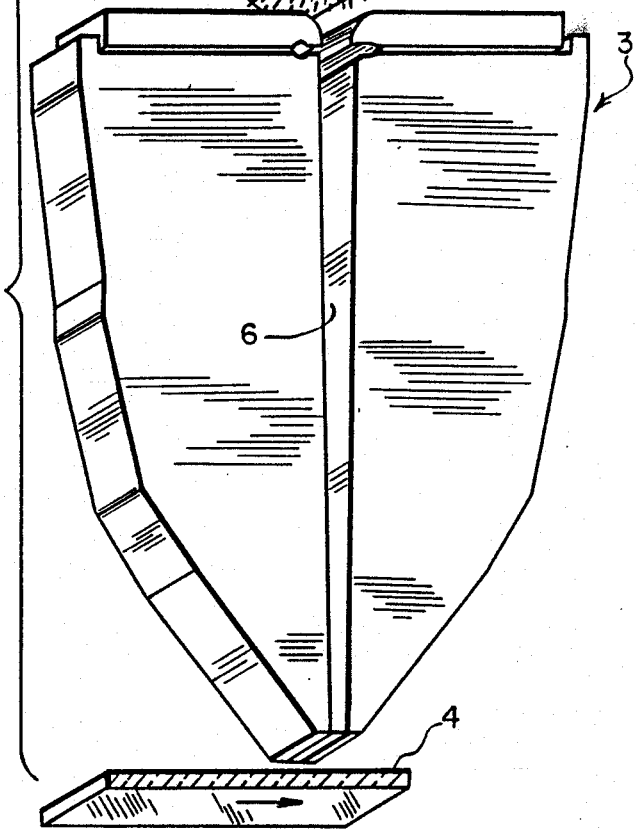
FIG. 4 is a cross-sectional view of a third preferred embodiment of the present invention.

The end of conduits 13 is flush with slits 34. The gas injected by slits 34 entrains the outside atmosphere into opening 6, in the spaces between conduits 13 and the space between the conduits and plates 38. This injected gas and this entrained atmosphere eliminate any risk of undesirable powder deposit on the walls of opening 6 and also eliminate any risk of backflow of powder through the nozzle input. Because opening 6 is open to the atmosphere, modification of the method of feeding powder does not require any modification of the nozzle itself. For example, it is possible to modify the spacing of conduits 13, or use a completely different feed means such as shown in FIG. 4 in which a powder filled sprocket drum 50 that is rotated on a horizontal shaft 51 above opening 6 while powder is extracted by a brush 52 that reciprocates horizontally as shown by the double headed arrow.

In both embodiments of nozzles 1 and 3, the output end of the nozzle has an aerodynamic tapered shape to promote entrainment of the ambient atmosphere around the curtain of powder delivered by distribution slit 7, thus avoiding the formation of turbulences harmful to uniform delivery of powder. This entrainment of ambient air aids in obtaining a uniform deposit on the substrate. Further, this end of the nozzle body is provided with means for protection from heat.

While the homogenizing and accelerating gases preferably are air, any other gas, for example, nitrogen, can be used. Of course, if it is desired to work in a controlled atmosphere, or a particular gas atmosphere, the upper part of this nozzle 3 of FIG. 3 must be sealed with an atmosphere control chamber filled with the desired gas.

As will be apparent from the foregoing description, numerous modifications may be made within the spirit and scope of the invention. The longitudinal extent of the nozzle can be whatever is required to coat the full width of a substrate that is moved past the nozzle. While the nozzle is oriented above the substrate in the vertical direction in the drawing, nozzle 1 can be used in various positions: above or below the substrate to be coated, perfectly vertical or inclined to the vertical, or laid horizontally or approximately horizontally if, for example, the substrate is vertical.

The nozzle may be used in many different applications to distribute powders of different natures (organometallic compounds, plastics, paints, varnishes, enamels, inks, pigments, etc.) regularly over the substrates such as glass, metal, wood, paper, etc. To make glass coated with layers having particular optical qualities, it is possible to distribute powders having bases of different metals (tin, indium, titanium, chromium, iron, cobalt...) and, by way of nonlimiting example, powders of dibutyltin oxide, dibutyltin difluoride, metal acetyl acetonates, etc.

The efficiency of these devices is such that they can be used to coat substrates passing at high speeds, up to 10 or 20 m/min. The efficiency is much greater than that obtainable with the techniques of spraying solutions or chemical vapor deposition (CVD). Of course, these performances can be improved even more by associating several nozzles to coat the same substrate.

In using these nozzles, it has further been found that the consumption of active product can be much less than that required by other techniques; thus it has been found that the weights of powder consumed per square meter of coated substrate are less than 10 grams and generally on the order of 3 to 8 grams for layers on the order of 1500 to 2000 Angstroms.

This process and these devices make it possible to obtain very regular thin layers whose variations in thickness can be less than 50 Angstroms and even as small as 30 to 40 Angstroms, thus introducing variations in light transmisson on the order of only 1% when "transparent" layers are made. This good regularity can be obtained over layers having a thickness less than a tenth of a micron, and even on the order of 400 to 800 Angstroms. A fortiori, making of regular but thicker layers is equally possible.

Because the deposited layers are so regular, it is possible to make antistatic layers. It is also possible to deposit sublayers, for example of $TiO_2$, that promote adherence of later coatings that may be deposited by the same technique or by other techniques such as vacuum techniques. Such sublayers have to be very thin, on the order of 400 to 500 Angstroms, to alter light transmission as little as possible, and perfectly continuous despite the very small thickness.

This process also permits the industrial manufacture of layers with interference coatings, i.e., coatings having a selected color, without variation of color due to variations of thickness. Thanks of this technique, it is even possible to make glasses coated with a layer of uniform second-order blue, with dominant wavelength in transmission of 575 nanometers and in reflection of 480 nanometers when illuminated by a standard C illuminant as defined by the International Commission on Illumination (CIE). Since this blue layer is the one for which divergences in thickness must be the slightest to avoid interferences and perceptible chromatic variations, it is also possible to make layers of another color or neutral tint for which the constraints are less severe.

Glasses coated with these layers can be used in many applications. Because the reduction in light transmission due to said layers is quite low, the coated glasses met the transmission requirement of at least 75% required by the automotive regulations of some countries. These coated glasses may also be used for housing, particular antiheat glasses, protective walls that reflect heat radiation as in the case of an oven window, and walls of insulating tanks. Substrates other than glass can, of course, also be coated, for example, pipe and metal plates. Glass in forms other than flat glass, for example, glass fibers can also be coated.

Illustrative examples of the process of the invention and of products thus obtained are as follows:

EXAMPLE 1

Substrate: float glass; thickness 4 mm; speed of movement past the nozzle: 12.50 m/min.

Powder: DBTF with a grain size less than 20 microns; delivery rate: 5.6 kg per hour per linear meter of nozzle length.

Nozzle: identical with the nozzle shown in FIG. 3; width of distribution slit 7:4.5 mm; distance between the lower end of the nozzle and glass: 90 mm.

Primary gas in which the powder is entrained at its intake by conduits 13: nitrogen at a rate of 135 $Nm^3$ per hour per linear meter of nozzle length; gas injected by slits 34: nitrogen at a rate of 335 $Nm^3$ per hour per linear meter of nozzle length.

Atmospheric air aspirated: 125 $Nm^3$ per hour per linear meter of nozzle length.

Layer obtained: $SnO_2$ monolayer doped with fluorine, thickness between 1635 and 1650 Angstroms (i.e., thickness divergences of 15 Angstroms); emissivity factor of the layer at 393° K: 0.3; light transmission : 83% ±1%; color: bluish in reflection, slight amber in transmission.

EXAMPLE 2

Substrate: glass 6 mm thick, speed or movement past the nozzle: 6 m/min.

Powder: mixture of:

| | |
|---|---|
| Fe acetyl acetonate | 25% |
| Cr acetyl acetonate | 25% |
| Co(II) acetyl acetonate | 50% |

Delivery rate: 1200 kg per hour per linear meter of nozzle.

Nozzle: identical with that shown in FIG. 1; distance between the lower end of the nozzle and glass; 90 mm;

Primary gas in which the powder is entrained at its intake by conduits 13: air at 200 $Nm^3$ per hour per linear meter of nozzle; homogenization gas: air at 60 $Nm^3$ per hour per meter of nozzle; acceleration gas: air at 250 $Nm^3$ per hour per meter of nozzle.

Layer obtained:

| | |
|---|---|
| light transmission: | 44% ± 1%. |
| light reflection: | 34% ± 1%. |

EXAMPLE 3

Substrate; float glass 4 mm thick.
Powder: DBTF.
Nozzle: identical with that shown in FIG. 3.
Layer obtained: $SnO_2$ monolayer doped with fluorine; thickness; 2400 to 2450 Angstroms; emissivity factor at 393°K.: 0.25; light transmission: 76% ±1%; color: golden yellow in reflection, slightly bluish in transmission.

What is claimed is:

1. A uniformly coated float glass product having a width of several meters and a continuous or indefinite length formed by a method for regularly distributing a pyrolytically decomposable powder onto a heated float glass substrate to form a metal oxide coating thereupon by pyrolytic decomposition comprising the steps of:

forming a sheet-like stream of powder suspended in a gas by introducing the powder into an elongated nozzle through a multiplicity of separate feeds that enter said nozzle at points removed from the substrate to be coated;

maintaining said powder stream in continuous flow in the direction of the substrate;

introducing gas currents into the powder stream to create turbulences therein and homogenize the mixture of gas and powder as it advances toward the substrate;

regularly accelerating the powder stream toward the substrate by entraining it in additional gas currents introduced at high velocity alongside the powder stream and aimed approximately in the direction of the substrate;

heat said float glass substrate to a temperature above that necessary to pyrolytically decompose said powder; and forming a uniform metal oxide coating upon said float glass substrate by pyrolytic decomposition of said powder so as to form a uniform coating of a thickness of less than about 2850 Angstroms having variations in thickness of less than about 50 Angstroms across the width and along the length of the float glass substrate.

2. The product of claim 1 wherein the regularity of the metal oxide coating is such that the variations in light transmission are at a maximum on the order of about one percent.

3. The product of claim 1 wherein the coating is an $SnO_2$ layer doped with fluorine, whose dominant wavelength under illumination by source C is 480 nm in reflection and 575 nm in transmission.

4. The product of claim 1 wherein the coating has a thickness on the order of 400 to 800 Angstroms.

5. The product of claim 4 wherein the coating is a continuous $TiO_2$ layer with a thickness on the order of 500 Angstroms.

6. The product of claim 1 wherein the metal oxide coating is tin oxide doped with fluorine, the emissivity is at a maximum on the order of 0.3 and the light transmission is greater than about 75%.

7. The product of claim 1 wherein the accelerated powder stream is directed through an elongated slit in said nozzle having walls that converge in a direction toward the distal end of said slit.

8. The product of claim 1 wherein the gas currents have a velocity greater than that of the powder stream to create said turbulences and homogenization of said gas/powder mixture.

9. A uniformly coated float glass product comprising:
a float glass substrate having a width of several meters and a continuous or indefinite length; and
a coating of a second order blue color metal oxide deposited upon said substrate in a uniform thickness sufficient to provide a high degree of light transmission with minor variations thereof, said coating thickness varying by less than 50 Angstroms across the width and along the length of said float glass so as to avoid perceptible chromatic variations of said metal oxide coating.

10. The product of claim 9 wherein the light transmission is greater than about 75% and varies on the order of about one percent.

11. The product of claim 9 wherein the metal oxide coating is tin oxide doped with fluorine.

12. The product of claim 11 wherein the dominant wavelength of the tin oxide coating under illumination by source C is about 480 nm in reflection and about 575 nm in transmission, and wherein the emissivity is at a maximum at about 0.3.

13. The product of claim 9 wherein the coating has a thickness on the order of between about 400 and 800 Angstroms.

14. The product of claim 13 wherein the coating is titanium dioxide.

15. The product of claim 14 which further comprises a second metal oxide coating upon said titanium dioxide coating.

16. The product of claim 15 wherein the second metal oxide coating comprises tin oxide.

17. A coated float glass product comprising:
a float glass substrate having a width of several meters and a continuous or indefinite length; and
a uniform coating of a second order blue color metal oxide deposited upon said substrate, said coating obtainable by pyrolytic decomposition of a DBTO, DBTF or metal acetyl acetonate powder having a grain size of between about 5 and 40 microns, said uniform coating having a thickness of about 2450 Angstroms or less, which provides a high degree of light transmission therethrough, said coating thickness varying by less than 50 Angstroms across the width and along the length of said float glass so as to avoid perceptible chromatic variations of said metal oxide coating.

18. The product of claim 17 wherein the coating is of a second order blue doped tin-oxide material having a thickness of about 2450 Angstroms or less.

19. The product of claim 17 wherein the powder is DBTF so that the metal oxide coating is tin oxide doped with fluorine.

20. The product of claim 19 wherein the dominant wavelength of the tin oxide coating under illumination by source C is about 480 nm in reflection and about 575 nm in transmission, and wherein the emissivity is at a maximum at about 0.3.

21. The product of claim 20 wherein the coating has a thickness on the order of between about 1635 and 1650 Angstroms.

22. The product of claim 21 wherein the light transmission is greater than about 75% and the variation of light transmission varies on the order of about one percent.

23. The product of claim 17 wherein the metal oxide coating is $TiO_2$.

24. The product of claim 23 further comprising a second coating of a metal oxide upon said $TiO_2$.

25. The product of claim 24 wherein the second metal oxide coating comprises tin oxide.

26. The coated float glass product comprising:
a float glass substrate having a width of several meters and a continuous or indefinite length;
a uniform coating of a first metal oxide deposited upon said substrate; and
a uniform coating of a second metal oxide deposited upon said first metal oxide coating;
said first and second coatings having a total thickness of about 2850 Angstroms or less and obtainable by pyrolytic decomposition of an organometallic powder having a grain size of between about 5 and 40 microns, said first and second coatings each having a thickness sufficient to provide a high degree of light transmission therethrough and a second order blue color, wherein each of said thickness varies by less than 50 Angstroms across the width and along the length of said glass so as to avoid perceptible chromatic variations of said first and second coatings.

27. The product of claim 21 wherein the first coating is present in a thickness range of between 400 and 800 Angstroms.

28. The product of claim 26 wherein the first coating is $TiO_2$.

29. The product of claim 26 wherein the second coating comprises tin oxide.

30. The product of claim 29 wherein the tin oxide coating is doped with fluorine.

31. The product of claim 30 wherein the light transmission for each coating is greater than about 75% and varies on the order of less than about 1 percent.

32. The product of claim 30 wherein the dominant wavelength of the tin oxide coating under illumination by source C is about 480 nm in reflection and about 575 nm in transmission, and wherein the emissivity is at a maximum at about 0.3.

33. The product of claim 26 wherein the second coating is of a second order blue doped tin oxide material having a thickness of about 2450 Angstroms or less.

34. The product of claim 26 wherein the first coating is $TiO_2$ of about 400 Angstroms thickness.

35. The product of claim 34 wherein the second coating is of a second order blue doped tin oxide material having a thickness of about 2450 Angstroms or less.

* * * * *